(12) United States Patent
Fellows et al.

(10) Patent No.: US 9,739,298 B2
(45) Date of Patent: Aug. 22, 2017

(54) ADVANCED CLIP RETAINER

(71) Applicant: GM Global Technology Operations LLC, Detroit, MI (US)

(72) Inventors: Jeremy P. Fellows, Davisburg, MI (US); Kelly M. Mazzola, Harrison Township, MI (US); Randy J. Freckelton, Eastpointe, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 14/676,972

(22) Filed: Apr. 2, 2015

(65) Prior Publication Data

US 2016/0290380 A1 Oct. 6, 2016

(51) Int. Cl.
*F16B 17/00* (2006.01)
*F16B 5/06* (2006.01)
*B60R 13/02* (2006.01)
*F16B 21/09* (2006.01)
*F16B 21/08* (2006.01)

(52) U.S. Cl.
CPC ........ *F16B 5/0657* (2013.01); *B60R 13/0206* (2013.01); *F16B 17/00* (2013.01); *F16B 21/086* (2013.01); *F16B 21/09* (2013.01); *Y10T 24/301* (2015.01); *Y10T 24/309* (2015.01); *Y10T 24/45105* (2015.01)

(58) Field of Classification Search
CPC . Y10T 24/309; Y10T 24/30; Y10T 24/44026; B60R 13/0206; F16B 5/0657; F16B 5/065; F16B 21/086; F16B 21/09

USPC .............. 24/580.11, 289, 295, 297
See application file for complete search history.

(56) References Cited

U.S. PATENT DOCUMENTS

| | | | | |
|---|---|---|---|---|
| 3,006,049 A * | 10/1961 | Jansson | ..................... | F16B 2/02 24/289 |
| 3,771,275 A * | 11/1973 | Seckerson | ............... | F16B 5/065 403/388 |
| 4,424,612 A * | 1/1984 | Muller | ................ | B60R 13/0206 24/289 |
| 4,867,599 A * | 9/1989 | Sasajima | .................. | B62D 1/16 24/297 |
| 5,195,793 A * | 3/1993 | Maki | ....................... | F16B 5/128 24/297 |
| 5,275,455 A * | 1/1994 | Harney | ................... | B60R 13/04 24/297 |
| 5,507,610 A * | 4/1996 | Benedetti | .............. | F16B 5/0628 24/297 |
| 5,639,522 A * | 6/1997 | Maki | ....................... | B60R 13/04 156/211 |
| 5,651,634 A * | 7/1997 | Kraus | .................... | F16B 5/0628 403/331 |
| D456,699 S * | 5/2002 | Nakanishi | ....................... | D8/382 |
| 6,715,185 B2 * | 4/2004 | Angellotti | ............... | F16B 5/065 24/297 |
| 7,114,221 B2 * | 10/2006 | Gibbons | ................. | F16B 5/065 24/289 |

(Continued)

*Primary Examiner* — Robert J Sandy
*Assistant Examiner* — Rowland Do
(74) *Attorney, Agent, or Firm* — Lorenz & Kopf, LLP

(57) ABSTRACT

A product for fastening a component in place may include a retainer connected with the component. The retainer may have a platform and may have a wall extending between the component and the platform. The platform may define an opening that may be configured for fastening. The wall may define a slot.

5 Claims, 3 Drawing Sheets

(56) References Cited

U.S. PATENT DOCUMENTS

| | | | | |
|---|---|---|---|---|
| 7,152,281 | B2* | 12/2006 | Scroggie | B60R 13/0206 24/289 |
| 7,165,371 | B2* | 1/2007 | Yoyasu | B60R 13/04 24/292 |
| 7,178,855 | B2* | 2/2007 | Catron | B60J 5/0468 24/297 |
| 7,698,787 | B2* | 4/2010 | Scroggie | F16B 21/082 24/297 |
| 7,927,050 | B2* | 4/2011 | Koike | F16B 5/0628 411/104 |
| 7,954,205 | B2* | 6/2011 | Xueyong | B60R 13/0206 24/289 |
| 8,291,553 | B2* | 10/2012 | Moberg | B60J 5/0468 24/297 |
| 8,656,563 | B2* | 2/2014 | Hiramatsu | F16B 41/002 24/297 |
| 8,671,528 | B2* | 3/2014 | Hayashi | F16B 5/065 24/297 |
| 9,022,447 | B2* | 5/2015 | Schidan | B60R 13/0206 296/1.08 |
| 9,302,569 | B2* | 4/2016 | Ogino | B60J 5/0418 |
| 2003/0230044 | A1* | 12/2003 | Peterson | B60R 13/0206 52/716.5 |
| 2004/0083583 | A1* | 5/2004 | Bradley | F16B 5/0657 24/297 |
| 2007/0107174 | A1* | 5/2007 | Bordas | B60R 13/0206 24/664 |
| 2008/0260454 | A1* | 10/2008 | Girodo | B60R 13/0206 403/11 |
| 2009/0188086 | A1* | 7/2009 | Okada | B60R 13/0206 24/297 |
| 2009/0249587 | A1* | 10/2009 | Donahue-Yan | B60R 13/0206 24/297 |

\* cited by examiner

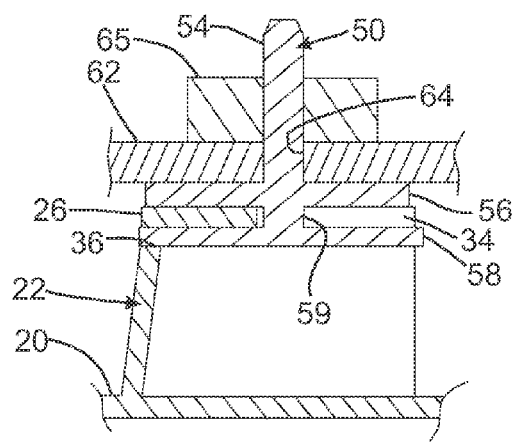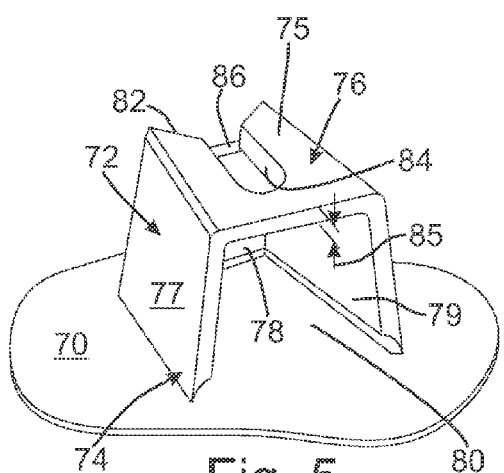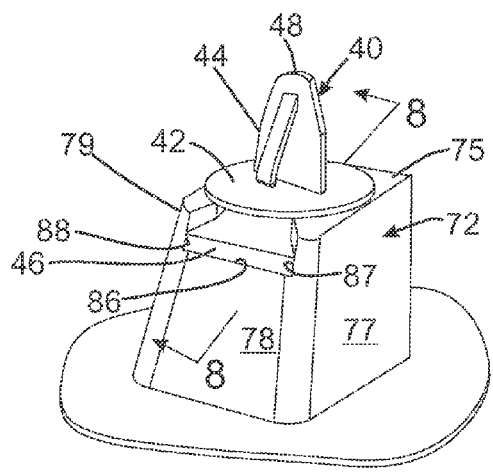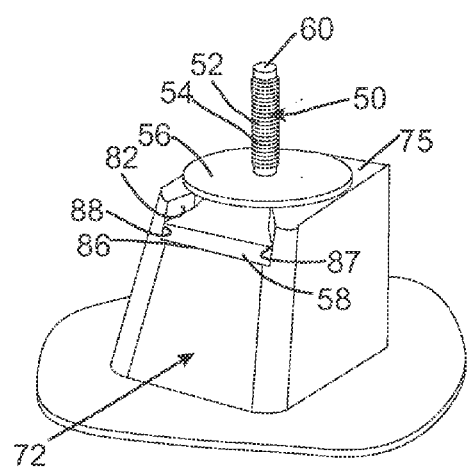

ADVANCED CLIP RETAINER

TECHNICAL FIELD

The field to which the disclosure generally relates includes fastening, and in particular includes retainers for fasteners.

BACKGROUND

Manufactured articles are typically assembled from a number of components that are integrated into a product. The individual elements may be engaged in a number of fashions, one of which involves being fastened together. Fasteners may take a wide number of forms.

SUMMARY OF ILLUSTRATIVE VARIATIONS

According to a number of variations a product for fastening a component in place may include a retainer connected with the component. The retainer may have a platform and may have a wall extending between the component and the platform. The platform may define an opening that may be configured for fastening. The wall may define a slot.

A number of other variations may involve a product for fastening a first component to a second component. A retainer may be connected to the first component with a slot extending through the retainer. A platform may be formed by the retainer, with an opening extending through the platform. A fastener may be engaged with the retainer. The fastener may include a stem extending through the opening and may include a head extendable into the slot. The fastener may extend into the second component wherein the first component may be fastened to the second component through the retainer and the fastener.

Additional variations may involve product for fastening a component. A base may be connected to the component. The base may have a first wall and a second wall opposite the first wall. The base may have a third wall extending between the first wall and the second wall, wherein a side of the base opposite the third wall may be substantially open. A platform may be supported by the base. An opening may extend through the platform, and a slot may extend through the third wall.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 4 is a cross sectional illustration taken along the line 4-4 of FIG. 3.

FIG. 5 is a perspective illustration of a retainer according to a number of variations.

FIG. 6 is a perspective illustration of a retainer and fastener according to a number of variations.

FIG. 7 is a perspective illustration of a retainer and fastener according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
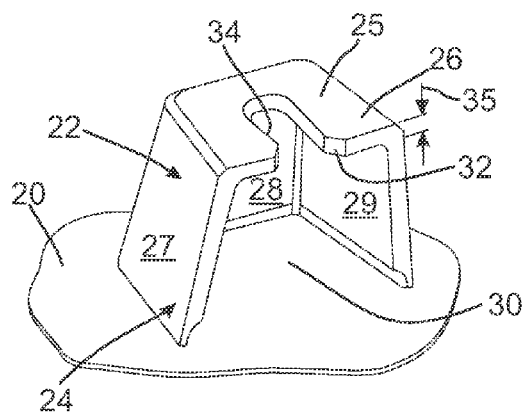
FIG. 1 is a perspective illustration of a retainer according to a number of variations.

In assembly, one of the challenges in efficient fastening of components may involve connecting a part, such as a trim component to a base component where the fasteners are invisible from the outer surface of the assembled trim component. According to a number of variations described in relation to FIG. 1, the body of a component 20 may be provided with a retainer 22. The retainer 22 may include a proximal end whereby a base 24 may be connected to the component 20. The retainer 22 may include a spaced apart distal end forming a raised substantially flat platform 26. The platform 26 may include an outward facing surface 25, which faces away from the body of the component 20. The space between the body of the component 20 and the platform 26 may be substantially open and the base 24 may include walls 27, 28 and 29 extending between and connecting with the body of the component 20 and the platform 26. A fourth side 30 of the retainer 22 may be open in the direction between the walls 27, 29 and in the direction between the component 20 and the platform 26. An entry 32 may be formed in the platform 26 leading in from the open side 30 to a mounting opening 34 defined by the platform 26. The entry 32 may flare outwardly to provide a wider entrance than the width of the mounting opening 34. The mounting opening 34 may extend completely through the thickness 35 of the platform 26 and may be configured for receiving a fastener.

Figure 2:
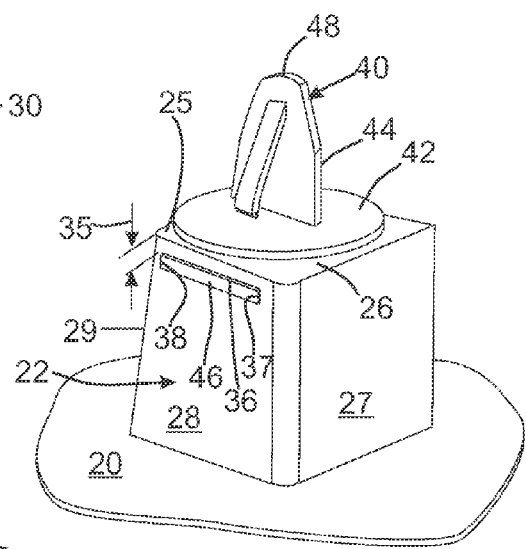
FIG. 2 is a perspective illustration of a retainer and fastener according to a number of variations.

Referring to FIG. 2 the retainer 22 is illustrated from a perspective showing the outside of the walls 27 and 28. A rectangular engagement slot 36 may be defined by the wall 28 and may be formed through the wall 28 extending longitudinally from a first end 37 proximate the wall 27 to a second end 38 proximate the wall 29. The engagement slot 36 may be spaced apart from the surface 25 a distance equal to the thickness 35 of the platform 26. A fastener in the form of a clip 40 may be engaged with the retainer 22. The clip 40 may be of the push-in type that may be inserted into an opening to connect the component 20 to another component and may be a "christmas tree" type clip, a W-base clip as shown, or another variety. The clip 40 may extend through the mounting opening 34 and may be of the dual-head type including a washer feature fixed to the stem in the form of a bottom head 42 that may extend around the stem 44 in the shape of a ring. The bottom head 42 may be positioned outside the retainer 22 against or adjacent the surface 25. The clip 40 may include a top head 46 connected to the stem 44 on an opposite side of the bottom head 42 from the tip 48. The top head 46 may be shaped to fit the engagement slot 36 and may extend into or through (as shown), the engagement slot 36 when the clip 42 is engaged with the retainer 22. To fit within the engagement slot 36, the top head 46 may have a rectangular cross section. The clip 40 may be mounted onto the retainer 22 with a reduced segment of the stem 44, which may have a circular cross section, entering through the entry 32 and then extending through the mounting opening 34 and with the top head 46 entering through the open side 30. The top head 46 may engage in the engagement opening 36, which may provide added strength enabling a reduced size of the retainer 22.

Figure 3:
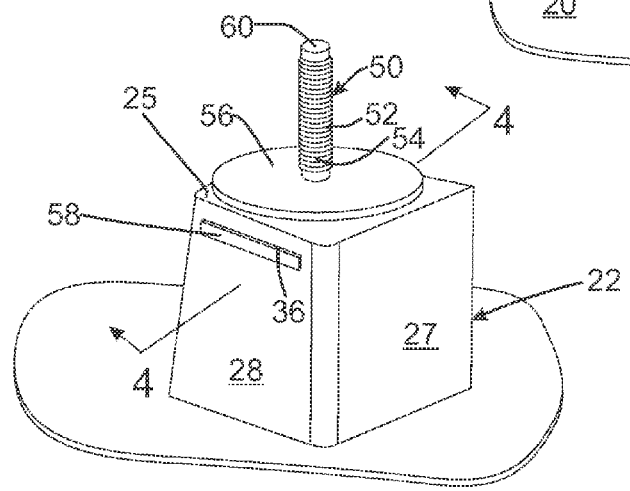
FIG. 3 is a perspective illustration of a retainer and fastener according to a number of variations.

Referring to FIG. 3, the retainer 22 may accommodate other forms of fasteners such as a stud 50, which may be a T-stud. The stud 50 may include a threaded section 52 of the stem 54, which may be inserted through an opening in a mating component and may receive a nut to secure the components together. The stud 50 may be used where access may be gained to apply and torque a nut on the stem 54. The stem 54 may extend through the mounting opening 34 and may be of the dual-head type including a washer feature fixed to the stem in the form of a bottom head 56 that may extend around the stem 54 in the shape of a ring. The bottom head 56 may be positioned outside the retainer 22 against or adjacent the surface 25. The stem 54 may include a top head 58 connected to the stem 54 on an opposite side of the bottom head 56 from the tip 60. The top head 58 may be shaped to fit the engagement slot 36 and may extend into or through (as shown), the engagement slot 36 when the stud 50 is engaged with the retainer 22. To fit within the engagement slot 36, the top head 46 may have a rectangular cross section. The interface between the retainer 22 and the stud 50 may be strengthened through engagement of the top head 58 in the slot 36.

The retainer 22 and stud 50 are shown in cross section in FIG. 4. The component 20 may be fastened to another component 62 through the retainer 22 and the stud 50. The retainer 22 may be integrally formed with the component 20 or may be a separate connected piece. The stud 50 may be inserted into the mounting opening 34 so that the platform 26 is positioned between the bottom head 56 and the top head 58 and a segment 59 of the stem 54 extends through the platform 26 at the mounting opening 34. The top head 58 may extend through the engagement slot 36. The stem 54 may extend through an opening 64 in the component 62 and a nut 65 may be threaded onto the stem 54. By extending the top head 58 into the engagement slot 36, torque rotation of the stud 50 may be contained and loads may be evenly distributed. In addition, the engagement slot 36 may allow movement of the stud 50 (or the clip 40), through the mounting opening 34 during assembly or during relative movement of the components 20, 62 such as may result from temperature changes.

As shown in FIG. 5, a number of other variations may be described in relation to a component 70 which may be provided with a retainer 72. The retainer 72 may include a base 74 with a proximal end connected to the component 70 and a spaced apart distal end forming a raised substantially flat platform 76. The platform 76 may include an outward facing surface 75. The space between the component 70 and the platform 76 may be substantially open with walls 77, 78 and 79 of the base 74 extending between and connecting with the component 70 and the platform 76. A fourth side 80 of the retainer 72 may be open in the direction between the walls 77, 79 and in the direction between the component 70 and the platform 76. An entry 82 may be formed in the platform 76 entering in from the side of the wall 78 leading to a mounting opening 84 configured for receiving a fastener. The entry 82 may flare outwardly to provide a wider entrance than the width of the mounting opening 84. The mounting opening 84 may extend completely through the thickness 85 of the platform 76. The entry 82 may be formed contiguous with a rectangular slot 86 that may be formed through the wall 78 as more readily shown in FIG. 6.

As shown in FIG. 6, the slot 86 may extend longitudinally from a first end 87 proximate the wall 77 to a second end 88 proximate the wall 79. The slot 86 may be spaced apart from the surface 75 a distance equal to the thickness 85 of the platform 76. A fastener, such as the clip 40 may be engaged with the retainer 72. The clip 40 may extend through the mounting opening 84 and may be of the dual-head type including a bottom head 42 that may extend around the stem 44 in the shape of a ring. The bottom head 42 may be positioned outside the retainer 72 against or adjacent the surface 75. The clip 40 may include a top head 46 connected to the stem 44 on an opposite side of the bottom head 42 from the tip 48. The top head 46 may be shaped to fit through the slot 86. The clip 40 may be mounted onto the retainer 72 with a reduced size segment of the stem 44 entering through the entry 82 and then extending through the mounting opening 84 and with the top head 46 entering the retainer 72 through the slot 86.

Referring to FIG. 7, the retainer 72 may accommodate other forms of fasteners such as a stud 50. The stud 50 may include a threaded section 52 of the stem 54, which may be inserted through an opening in a mating component and may receive a nut to secure the components together. The stud 50 may be used where access may be gained to apply and torque a nut on the stem 54. The stem 54 may extend through the mounting opening 84 and may be of the dual-head type including a washer-type bottom head 56 that may extend around and be fixed to the stem 54 in the shape of a ring. The bottom head 56 may be positioned outside the retainer 72 against or adjacent the surface 75. The stud 50 may include a top head 58 connected to the stem 54 on an opposite side of the bottom head 56 from the tip 60. The top head 58 may be shaped to fit within the slot 86. The stud 50 may be mounted onto the retainer 72 with the stem entering through the entry 82 and then extending through the mounting opening 84 and with the top head 58 entering through the slot 86.

Figure 8:
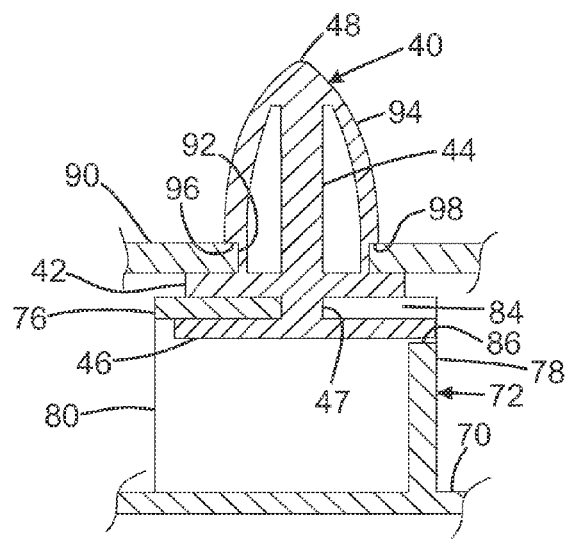
FIG. 8 is a cross sectional illustration taken along the line 8-8 of FIG. 6.

The retainer 72 and the clip 40 are shown in cross section in FIG. 8. The component 70 may be fastened to another component 90 through the retainer 72 and the clip 40. The retainer 72 may be integrally formed with the component 70 or may be a separate connected piece. The clip 40 may be inserted into the mounting opening 84 from the side of the wall 78 opposite the open side 80, so that the platform 76 is positioned between the bottom head 42 and the top head 46 and a segment 47 of the stem 44 extends through the platform 76 at the mounting opening 84. The segment 47 may have a circular cross section. The top head 46 may pass through the slot 86 as the segment 47 of the stem 44 is positioned into the mounting opening 84. The tip 48 of the clip 40 may be positioned through an opening 92 in the component 90. The W-shaped base 94 may include tabs 96, 98 may clip onto the component 90. The component 70 may be fastened to the component 90 through the retainer 72 and the clip 40.

Figure 9:
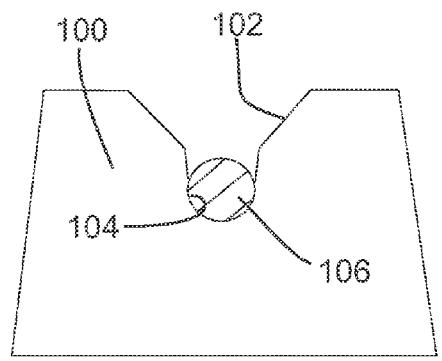
FIG. 9 is a schematic illustration at the top surface of a retainer according to a number of variations.

A number of additional variations may involve the platform 100 as shown in FIG. 9. The platform 100 may be used with the retainer 22 or the retainer 72, and may include an entry 102 leading to an opening 104. A fastener, such as the fasteners 40, 50 may include a stem segment 106 that may be passed through the entry 102 and may clip into the mounting opening 104. The platform 100 may lock the stem 106 of the fastener in position and may provide a 4-way means of retaining two components together where relative movement may not be necessary such as with a single point connection.

Figure 10:
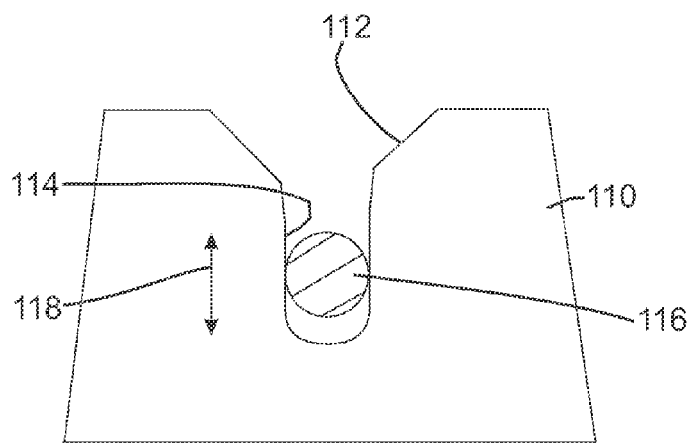
FIG. 10 is a schematic illustration at the top surface of a retainer according to a number of variations.

A number of additional variations may involve the platform 110 as shown in FIG. 10. The platform 100 may be used with the retainer 22 or the retainer 72, and may include an entry 112 leading to an elongated mounting opening 114. A fastener, such as the fasteners 40, 50 may include a stem segment 116 that may be passed through the entry 112 and may be positioned in the mounting opening 114. The platform 110 may allow the stem 116 of the fastener to move in the direction indicated at 118, and may provide a 2-way means of retaining two components together where relative movement may be provided in the direction 118, such as with a multiple point connection. Movement perpendicular to the direction 118 may be contained by the platform 110.

The following description of variants is only illustrative of components, elements, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product for fastening a component in place. A retainer may be connected with the component. The retainer may have a platform with a wall extending between the component and the platform. The platform may define an opening that may be configured for fastening and the wall may define a slot.

Variation 2 may include the product of variation 1 and may include a fastener that has a stem extending through the opening. The fastener may have a head extending outward from the stem wherein the head may be extendable into the slot and may be positioned adjacent the platform.

Variation 3 may include the product of variation 2 wherein the fastener may include a washer fixed to the stem and positioned on an opposite side of the platform from the head.

Variation 4 may include the product according to any of variations 1 through 3 wherein the slot may be formed contiguous with the opening.

Variation 5 may include the product according to any of variations 1 through 4 wherein the opening may be elongated so that the fastener may move within the opening.

Variation 6 may include the product according to any of variations 1 through 5 wherein the retainer may include an open side opposite the wall, wherein the open side may be substantially open into the retainer.

Variation 7 may include the product according to any of variations 1 through 6 wherein the slot is separate from the opening and wherein the wall includes an inside surface facing the open side and wherein the head extends into the slot from the inside surface.

Variation 8 may include a product for fastening a first component to a second component. A retainer may be connected to the component. A slot may extend through the retainer. A platform may be formed by the retainer, with an opening extending through the platform. A fastener may be engaged with the retainer. The fastener may include a stem extending through the opening. A head of the fastener may extend into the slot. The fastener may extend into the second component. The first component may be fastened to the second component through the retainer and the fastener.

Variation 9 may include the product according to variation 8 wherein the fastener may include a washer fixed to the stem and may be positioned on an opposite side of the platform from the head.

Variation 10 may include the product according to variation 8 or 9 wherein the slot may be formed contiguous with the opening.

Variation 11 may include the product according to any of variations 8 through 10 wherein the opening may be elongated so that the fastener may move within the opening.

Variation 12 may include the product according to any of variations 8 through 11 wherein the retainer may include an open side opposite the slot, wherein the open side may be substantially open into the retainer.

Variation 13 may include the product according to variation 12 wherein the slot may be separate from the opening and wherein the retainer may include an inside surface adjacent the slot. The inside surface may face the open side. The head may extend into the slot from the inside surface.

Variation 14 may include the product according to variation 12 wherein the platform may have a thickness and an outer surface. The slot may be positioned away from the outer surface a distance equal to the thickness.

Variation 15 may include a product for fastening a component. A base may be connected to the component. The base may have a first wall and a second wall opposite the first wall. The base may have a third wall extending between the first wall and the second wall wherein a side of the base opposite the third wall may be substantially open into the base. A platform may be supported by the base. An opening may extend through the platform. A slot may extend through the third wall.

Variation 16 may include the product according to variations 15 and may include a fastener that may have a stem extending through the opening. The fastener may have a head extending outward from the stem wherein the head may be extendable into the slot and may be positioned adjacent the platform.

Variation 17 may include the product according variation 16 wherein the third wall may include an inside surface facing the side. The opening may be separate from the slot. The head may extend into the slot from the inside surface.

Variation 18 may include the product according variation 16 wherein the opening may be contiguous with the slot.

Variation 19 may include the product according to variation 18 wherein the third wall may include an outside surface facing away from the side. The head may be slidable through the slot from the outside surface.

Variation 20 may include the product according to variation 19 wherein the fastener may include a washer fixed to the stem and positioned on an opposite side of the platform from the head.

The above description of select variations within the scope of the invention is merely illustrative in nature and, thus, variations or variants thereof are not to be regarded as a departure from the spirit and scope of the invention.

What is claimed is:

1. A product for fastening a component comprising:
a base connected to the component, the base has a first wall and a second wall opposite the first wall and the base has a third wall extending between the first wall and the second wall wherein a side of the base opposite the third wall is substantially open into the base; a platform supported by the base, with an opening extending through the platform; wherein a slot extends through the third wall; a fastener that has a stem extending through the opening and the fastener has a head extending outward from the stem wherein the head extends into the slot and is positioned adjacent the platform, wherein the opening is contiguous with the slot, and wherein the third wall includes an outside surface facing away from the side and wherein the head is slidable through the slot from the outside surface and into the base.

2. The product according to claim 1 further comprising a second component to which the fastener is fastened.

3. The product according to claim 2 comprising a second opening defined in the second component into which the fastener clips.

4. The product according to claim 3 comprising a pair of tabs on the fastener clipped to the second component.

5. The product according to claim 1 wherein the fastener includes a washer fixed to the stem and positioned on an opposite side of the platform from the head.

\* \* \* \* \*